C. F. GRABAU.
SPRING CLIP.
APPLICATION FILED MAY 7, 1909.
993,773.
Patented May 30, 1911.
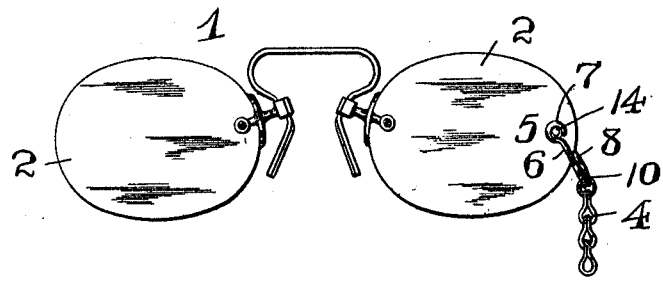
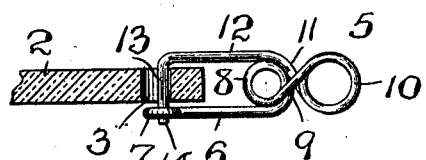
Fig. 2
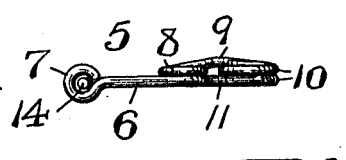
Fig. 4
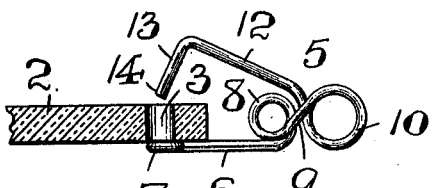
Fig. 3
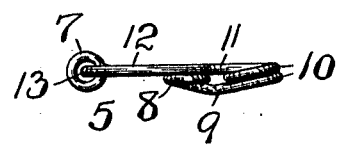
Fig. 5
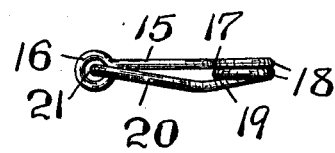
Fig. 7
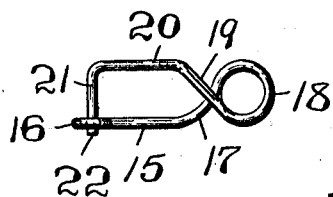
Fig. 6
WITNESSES:
Fredk. H. W. Fraentzel
Anna H. Alter
INVENTOR:
Charles F. Grabau,
BY
Fraentzel and Richards,
ATTORNEYS.

UNITED STATES PATENT OFFICE.

CHARLES F. GRABAU, OF NEWARK, NEW JERSEY, ASSIGNOR OF ONE-HALF TO HENRY AURNHAMMER, OF NEWARK, NEW JERSEY.

SPRING-CLIP.

993,773.  Specification of Letters Patent.  Patented May 30, 1911.

Application filed May 7, 1909. Serial No. 494,567.

*To all whom it may concern:*

Be it known that I, CHARLES F. GRABAU, a citizen of the United States, residing at Newark, in the county of Essex and State of New Jersey, have invented certain new and useful Improvements in Spring-Clips; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in fasteners employed with eye-glasses for the attachment of the usual chain or attaching cord to one of the lenses; and, the present invention has reference, more particularly, to a novel spring-clip, which can be readily operated so as to be sprung into place over the edge of a lens, and can just as readily be disengaged from its connected relation with the lens, without the employment of the pliers for fastening the device in place upon the lens, or for removing it therefrom when necessary.

Other objects of this invention not at this time more particularly enumerated will be clearly understood from the following detailed description of my present invention.

The invention is clearly illustrated in the accompanying drawings, in which:—

Figure 1 is a front view of a pair of eye-glasses and a view of spring-clip, embodying the principles of the present invention, attached to one of the lenses, said view showing in connection therewith a portion of an ordinary ornamental chain, such as is used with chain-fasteners or clips for eye-glasses. Fig. 2 is a face view of the fastener or clip, and a horizontal sectional representation of a portion of an eye-glass lens, said view being made on a considerably enlarged scale, and the parts of the fastener or clip being represented in their normal positions when the spring-clip has been fastened to the lens. Fig. 3 is a similar view of the parts represented in said Fig. 2, but showing the parts of the spring-clip moved by an operator into their separated relation from the lens, so as to disconnect the clip from said lens. Figs. 4 and 5 are edge views of the two longitudinal edge-portions or sides of the form of spring-clip represented in said Figs. 1, 2 and 3. Fig. 6 is a face view of a modified form of fastener or clip embodying the principles of this invention; and Fig. 7 is an edge view of the same.

Similar characters of reference are employed in all of the above described views, to indicate corresponding parts.

Referring now to the said figures of the drawings, the reference-character 1 indicates any usual construction of eye-glasses, and 2 indicates the lenses thereof, one of which, as in the present form of eye-glasses, is provided with a perforation 3.

The chain or cord-fastener, for fastening in this case a chain 4 to the lens 2, is generally indicated by the reference-character 5, and the same is made from spring-wire, the spring-clip, as is shown in Figs. 1 to 5 inclusive, consisting of a body-member 6 which is made at one end with a bent part 7, forming a receiving eye. At its opposite end-portion the said member 6 is made with a helical coil or spring 8, and extending from said coil 8 is a connecting member 9 which is provided at its free end with a helical coil 10, usually consisting of two helices, substantially as shown in the drawings, said helical coil 10 providing a finger piece. Extending from the said coil or finger piece 10 is a suitably bent portion or member, as 11, with which is connected a spring-arm 12, lying in the same or substantially the same plane of the body-member 6, as will be clearly evident from an inspection of Figs. 4 and 5 of the drawings. Extending at right angles, or approximately so, from the free end-portion of the said spring-arm 12 is a finger 13, said finger, in its normal position, having its free end-portion 14 extending into and preferably through the previously mentioned eye 7, as will be clearly evident from an inspection of the several figures of the drawings.

The end of the chain 4, or other suitable flexible element, as a cord, ribbon, or the like, is inserted in the coil or finger piece 10 and fastened in any suitable manner. The said coil or finger piece 10 provides a means for manipulating said spring-arm 12 against the tension of said helical coil or spring 8, to remove its finger 13 from engagement with said eye 7, and the perforations in said lens 2.

To connect the fastener 5 to the lens 2, the operator raises the spring-arm 12 to a position indicated in Fig. 3 of the drawings. The eye of the body-member 6 is then slipped beneath one of the faces of the lens 2 until the eye 7 is brought directly beneath the perforation 3 in the lens, the said eye 7 having been brought in alinement with the perforation in the lens, it serves as a proper bearing for the proper guidance of the finger of the spring-arm 12 into and through the perforation 3 from the other face of the lens. The finger 13 of the spring-arm 12 having been moved over the opposite face of the lens, until its free end 14 is directly above the said perforation 3, the said spring-arm 12 is released and the said finger 13 moves down into and through the said perforation 3 and enters the eye 7, whereby the parts arrange themselves in the positions indicated in Fig. 2 of the drawings. The clip 5 is thus positively and pivotally connected with the lens 2 against any accidental displacement, being thus detachably secured in place without any use of the pliers or other tool or implement for fastening the clip to the lens, as will be clearly evident.

Referring now to the modified form of clip represented in Figs. 6 and 7 of the drawings, the device consists of a body-member 15, formed at one end with an eye 16, and at its opposite end with a suitably bent end-portion 17 and a helical coil 18. Extending from this coil 18 is a bent member 19, and connected therewith is a spring-arm 20. Extending at right angles, or approximately so, from the free end-portion of said spring-arm 20 is a finger 21, having its free end-portion 21 extending into and preferably through the previously mentioned eye 16, as clearly illustrated in said Figs. 6 and 7.

I claim:—

A spring-clip for the attachment of a chain, cord, or the like, to an eye-glass lens, said lens being provided with a perforation, comprising a fixed body-member formed at one end with an eye adapted to be placed upon one side of the lens so as to register with the perforation therein, said body-member being formed at its other end with a curved end-portion, a coil connected with said curved end-portion, said coil serving as a fingerpiece, a spring-arm connected with said coil, said spring-arm extending forwardly in the direction of the body-member, and a finger at the free end of said spring-arm and bent at an angle thereto, said finger being adapted to enter the perforation in said lens and the eye of said body-member, and adapted to be withdrawn therefrom by the manipulation of said fingerpiece, substantially as and for the purposes set forth.

In testimony, that I claim the invention set forth above I have hereunto set my hand this 6th day of May, 1909.

CHARLES F. GRABAU.

Witnesses:
    FREDK. H. W. FRAENTZEL,
    FREDK. C. FRAENTZEL.

---

Copies of this patent may be obtained for five cents each, by addressing the "Commissioner of Patents, Washington, D. C."